United States Patent
Bannon et al.

(10) Patent No.: US 9,806,819 B1
(45) Date of Patent: Oct. 31, 2017

(54) IN-BAND CONTROL OF NETWORK ELEMENTS

(71) Applicant: Google Inc., Mountain View, CA (US)

(72) Inventors: Roy Michael Bannon, Palo Alto, CA (US); Nozar Azarakhsh, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/395,864

(22) Filed: Dec. 30, 2016

Related U.S. Application Data

(62) Division of application No. 14/484,983, filed on Sep. 12, 2014, now Pat. No. 9,571,199.

(Continued)

(51) Int. Cl.
| | |
|---|---|
| *H04B 10/08* | (2006.01) |
| *H04B 10/06* | (2006.01) |
| *H04J 14/00* | (2006.01) |
| *H04B 10/40* | (2013.01) |
| *H04Q 11/00* | (2006.01) |

(52) U.S. Cl.
CPC ......... *H04B 10/40* (2013.01); *H04Q 11/0066* (2013.01); *H04Q 2011/0073* (2013.01); *H04Q 2011/0086* (2013.01)

(58) Field of Classification Search
None
See application file for complete search history.

(56) References Cited

U.S. PATENT DOCUMENTS

| | | | | |
|---|---|---|---|---|
| 5,896,561 A | * | 4/1999 | Schrader | H04L 1/0025 370/445 |
| 6,229,855 B1 | * | 5/2001 | Takatori | H04B 3/08 324/628 |

(Continued)

OTHER PUBLICATIONS

Office Action dated Mar. 24, 2016 in U.S. Appl. No. 14/484,983.
Notice of Allowance dated Nov. 8, 2016 in U.S. Appl. No. 14/484,983.

*Primary Examiner* — Oommen Jacob
(74) *Attorney, Agent, or Firm* — McDermott Will & Emery LLP

(57) ABSTRACT

A network element that allows in-band control of the network element includes a plurality of interfaces for connecting to other network elements. The network element includes a high data rate transceiver logic configured for transmitting and receiving communications having a first data rate over a first communication channel. The network element also includes a low data rate transceiver logic configured for transmitting and receiving communications having a second data rate that is substantially lower than the first data rate over a second communication channel. The network element further includes a shared photodiode for receiving optical signals over the first and second communication channels. The shared photodiode also converts received optical signals into electrical signals for processing by one of the high data rate transceiver logic and the low data rate transceiver logic. A shared laser module configured to be driven by the high data rate transceiver logic and the low data rate transceiver logic is also included in the network element to output an optical signal over a fiber optic cable via one of the first and second communication channels.

19 Claims, 5 Drawing Sheets

Related U.S. Application Data

(60) Provisional application No. 61/991,823, filed on May 12, 2014.

(56) References Cited

U.S. PATENT DOCUMENTS

| | | | | |
|---|---|---|---|---|
| 6,337,886 | B1* | 1/2002 | Asahi | H04L 25/0262 |
| | | | | 375/316 |
| 6,519,472 | B1* | 2/2003 | Brennan | H04W 24/00 |
| | | | | 455/518 |
| 7,630,631 | B2* | 12/2009 | Aronson | H04B 10/40 |
| | | | | 398/185 |
| 8,401,400 | B2 | 3/2013 | Cai et al. | |
| 8,958,697 | B2 | 2/2015 | Soto et al. | |
| 9,100,139 | B2 | 8/2015 | Schmidt et al. | |
| 9,253,067 | B2 | 2/2016 | Rao et al. | |
| 9,258,215 | B2 | 2/2016 | Hussain et al. | |
| 2002/0181051 | A1* | 12/2002 | Ota | H04B 10/0771 |
| | | | | 398/28 |
| 2005/0180749 | A1* | 8/2005 | Koley | H04J 14/0283 |
| | | | | 398/45 |
| 2008/0005262 | A1* | 1/2008 | Wurzburg | G06F 13/4022 |
| | | | | 709/217 |
| 2008/0055010 | A1* | 3/2008 | Lerner | H03B 21/02 |
| | | | | 331/37 |
| 2008/0063407 | A1 | 3/2008 | Singh et al. | |
| 2008/0137570 | A1* | 6/2008 | Min | H04B 1/005 |
| | | | | 370/310 |
| 2009/0046745 | A1* | 2/2009 | Shin | H04J 3/047 |
| | | | | 370/535 |
| 2009/0154465 | A1* | 6/2009 | Diab | H04L 12/40136 |
| | | | | 370/395.1 |
| 2010/0254706 | A1* | 10/2010 | Hirth | H04J 14/0282 |
| | | | | 398/48 |
| 2011/0158202 | A1* | 6/2011 | Ozukturk | H04B 1/707 |
| | | | | 370/335 |
| 2011/0267037 | A1* | 11/2011 | Kharrati | G01R 13/0254 |
| | | | | 324/121 R |
| 2011/0293283 | A1* | 12/2011 | Dong | H04B 10/693 |
| | | | | 398/135 |
| 2012/0254495 | A1* | 10/2012 | Tang | H04L 49/351 |
| | | | | 710/316 |
| 2013/0286847 | A1 | 10/2013 | Schmidt et al. | |
| 2014/0056314 | A1* | 2/2014 | Sterman | H04L 65/1069 |
| | | | | 370/465 |
| 2014/0079400 | A1 | 3/2014 | Sengupta | |
| 2015/0201198 | A1* | 7/2015 | Marlatt | H04N 19/124 |
| | | | | 375/240.03 |

\* cited by examiner

IN-BAND CONTROL OF NETWORK ELEMENTS

RELATED APPLICATIONS

The present application is a divisional of co-pending U.S. patent application Ser. No. 14/484,983, titled "IN-BAND CONTROL OF NETWORK ELEMENTS" and filed on Sep. 12, 2014, which claims the benefit of and priority to U.S. Provisional Application No. 61/991,823, titled "IN-BAND CONTROL OF NETWORK ELEMENTS" and filed on May 12, 2014, both of which are incorporated herein by reference in their entirety.

FIELD OF THE INVENTION

The present disclosure relates generally to remote configuration of network elements, and, more particularly, to implementing an in-band control of network elements.

BACKGROUND

Configuration of both the hardware and software of each network element in a network is often required to allow communication between network elements. Such configuration may occur at device start-up, upon device reset, or during routine device operation. For example, configuration can include informing a network element of changes in the topology of the network. Communications associated with such configuration are typically transmitted over what is generally referred to as the "control plane" of the network. For large scale networks, an entire secondary network is often employed just for the control-plane. In some cases, very large networks may employ a tertiary network for control of the secondary control-plane network.

SUMMARY

One aspect of the present disclosure is directed to a network element that facilitates in-band control of the network element. The network element includes a high data rate transceiver logic configured for transmitting and receiving communications having a first data rate over a first communication channel. The network element also includes a low data rate transceiver logic configured for transmitting and receiving communications having a second data rate that is substantially lower than the first data rate over a second communication channel. The network element further includes a shared photodiode for receiving optical signals over the first and second communication channels. The shared photodiode also converts received optical signals into electrical signals for processing by one of the high data rate transceiver logic and the low data rate transceiver logic. A shared laser module configured to be driven by the high data rate transceiver logic and the low data rate transceiver logic is also included in the network element to output an optical signal over a fiber optic cable via one of the first and second communication channels.

Another aspect of the present disclosure is directed to a method for receiving data by a network element. The method begins with receiving a signal by a network interface of a network element. The network element then determines if the received signal is a high data rate signal or a low data rate signal. If the received signal is determined to be a high data rate signal, processing the signal into data by high data rate transceiver logic in the network element. If the received signal is determined to be a low data rate signal, processing the signal into data by low data rate transceiver logic in the network element. The method also includes determining the intended destination of the data. If the received signal is determined to be a low data rate signal, processing the data by control logic in the network element. If the received signal is determined to be a high data rate signal, processing the data by switching logic in the network element.

Another aspect of the present disclosure is directed to a method for transmitting control plane data to a network element. The method begins with checking for an operational high data rate communication channel between a first network element and a second network element over a physical link. In response to an operational high data rate communication channel being detected, data is transmitted from the first network element to the second network element via the physical link using the high data rate communication channel. In response to an operational high data rate communication channel not being detected, control plane data is transmitted from the first network element to the second network element over a low data rate communication channel via the physical link.

BRIEF DESCRIPTION OF THE FIGURES

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are descriptions of various concepts related to, and implementations of, methods, apparatuses, and systems for in-band control of network elements. The various concepts introduced above and discussed in greater detail below may be implemented in any of numerous ways, as the described concepts are not limited to any particular manner of implementation. Examples of specific implementations and applications are provided primarily for illustrative purposes.

Many large scale networks, such as the networks found in large data centers, can be thought of as including both a "data plane" and a "control plane." The data plane is used for communicating data packets between network hosts or between a host in the network and an external gateway (or vice versa), via a set of switches, routers, hubs, etc. (collectively referred to as "switches"). The term data plane is used to describe the physical components, such as hardware, software, and cabling, of the network that provide this functionality (such as forwarding, routing, error checking, etc.) as well as the functionality itself. In contrast, the control plane is used for communications between switches and their respective controllers. Such communications can convey routing and other configuration data, switch software updates, operational instructions (such as start-up, shut down, reset commands, etc.). The term control plane is used to describe the physical network components used for control plane communications, as well as the functionality provided by such communications.

A network can include communication links that are shared by the control plane and the data plane by including parallel control plane and data plane communication channels between neighboring network elements. The parallel communication channels are facilitated by the inclusion of additional transceiver logic in the network elements. The additional transceiver logic is capable of operating at a lower data rate, with higher reliability, than the primary data plane transceiver logic by the network elements. When appropriate, control plane data is transmitted and received over the lower data rate channel using the additional low data rate transceiver logic in the network elements. The use of parallel data plane and control plane communication channels over a common physical link may allow a large network to forgo, or at least reduce the scale and complexity, of a separate physical control plane network.

Figure 1:
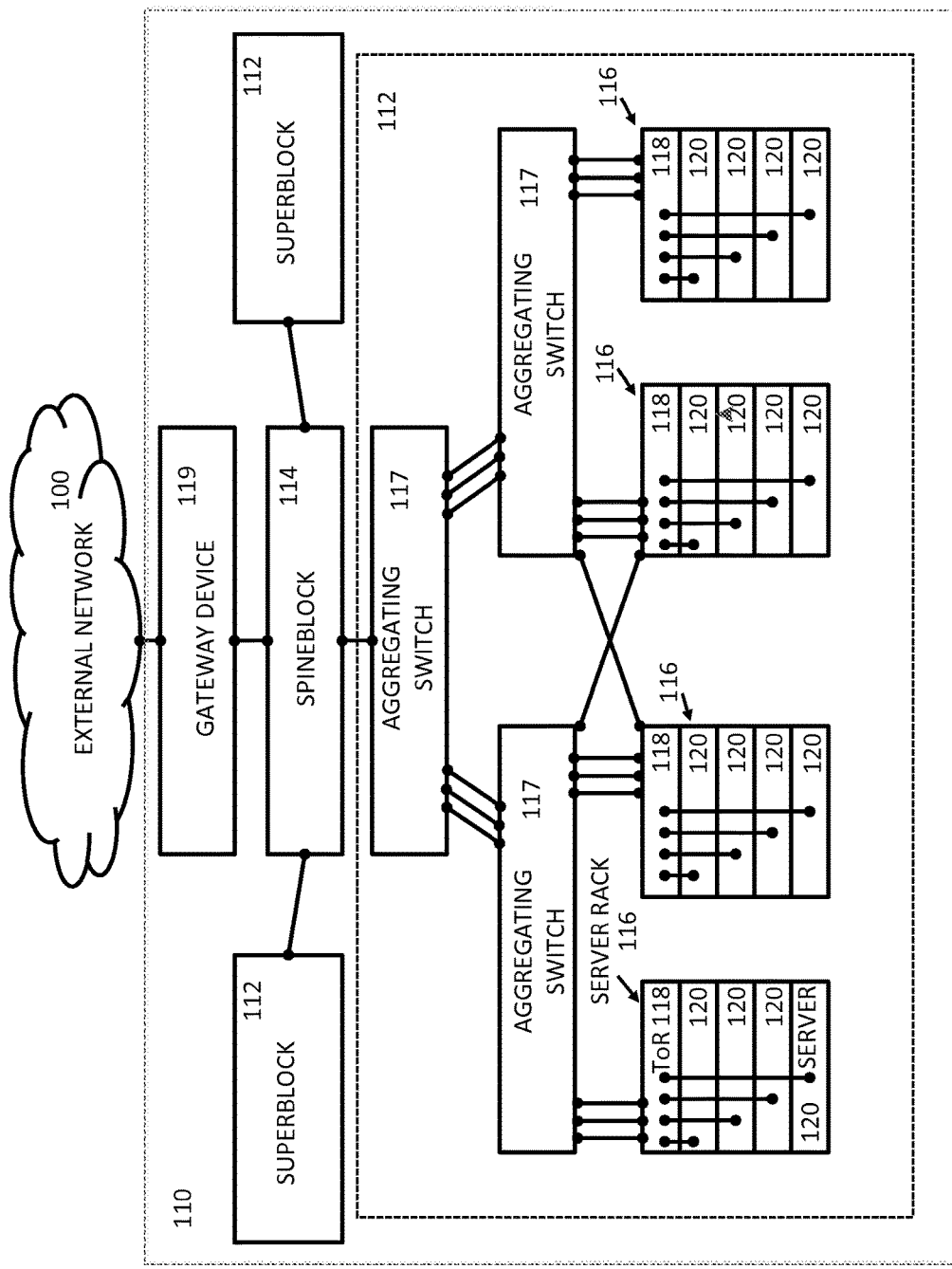
FIG. 1 is a schematic diagram of an example network.

FIG. 1 is a schematic diagram of an example data center network 110. In broad overview, a data center network 110 includes several interconnected superblocks 112. Each superblock 112 may include many hundred, and in some implementations over one thousand, servers 120 arranged in racks 116. The superblocks 112 are communicatively coupled to one another by optical and/or electrical communication links. The superblocks 112 can be connected directly, or through spineblocks 114, which serve as switches for routing data communications between the superblocks 112. Servers 120 in a data center network 110 can be connected to an external network 105 through a gateway device 119. The server racks 116 and servers 120 are connected to one another via a hierarchy of switches. For example, each server rack 116 includes a top-of-rack ("ToR") switch 118 for handling data communications into and out of a given server rack 116 and between servers 120 within a given server rack 116. ToR switches 118 may be connected to one or more aggregating switches 117. Aggregating switches 117 can be connected to one or more spineblocks 114. While, for illustrative purposes, the superblock 112 in the example data center network 110 only depicts three layers of switches (i.e., the top-of-rack switches 118 and two layers of aggregating switches) in the hierarchy of switches, in some implementations, a data center may include additional layers of switches in its switching hierarchy.

Each server rack 116 groups together, and houses, a plurality of servers 120. Each rack 116 also houses at least one ToR switch 118. Although illustrated as a single group of servers 120 per server rack 116, in practice, a server rack 116 may house multiple groups of servers 120 and a ToR switch 118 for each group.

Servers 120 are computing devices that include hardware and software components and are capable of storing, transmitting and receiving data. Servers provide data or computing services via the network. As part of providing data or computing services, the servers may interact with other servers in the network. The servers 120 in a data center network 110 may interact with one another by sending and receiving data packets via the network links. The servers 120 may transmit and receive data from other servers 120 in the same rack 116, on other racks 116 within the same superblock 112, within another superblock 112, or another data center network 110.

Collectively, server network interface cards, switches, and other communication devices in the data center network 110 are referred to as "network elements." Network elements facilitate the transmitting and receiving of data through the data center network 110 by forwarding data, generally, but not necessarily, in the form of data packets. In each network element, routing of data packets may be carried out through switching logic included in the network element.

In order for data packets to be transmitted and received through the network, the network elements are configured by network controllers (not shown). The network controllers can take the form of computer executable instructions executed by computer processors. The network controller software can be executed on stand-alone computers, or it can be executed on one or more of the servers 120. Configuring the network elements can include configuring the software and/or hardware of the network element, as well as providing operational data to the network element, for example, a forwarding information base (FIB) or routing information base (RIB). The configuration process can also include establishing that the network element is working properly and establishing the connectivity of the network element to other network elements in the network.

Large scale networks often employ secondary control plane networks dedicated to communicating configuration messages between network controllers and various network elements in the network. As networks continue to grow in size, the control plane network can become so large that the networks include a tertiary network that acts as a control plane network for the secondary network. The proliferation of control plane network hardware and cabling increases the complexity of large scale networks, increases their power consumption, and the level of maintenance needed to maintain proper operation of the network.

Allowing control plane communications to be carried across links used for data plane communications can help reduce this proliferation of dedicated control plane hardware. However, typical data plane communication channels employed in many computer networks, such as the data center network 110, tend to be unsuitable for many control plane communications. More specifically, as data centers grow, so too does the data rates used for communication between network elements. These higher data rate communication channels, for example, with data rates of 10 Gbps, 40 Gbps, 100 Gbps, or greater, can be less reliable than lower data communication channels. The higher reliability of lower data rate communication channels can be due to a lower instance of bit errors or packet errors resulting from slower modulation or line coding schemes, as are used in lower data rate communication channels. As proper operation can depend on receipt of accurate configuration information, in some implementations, lower data rate communication channels are more suitable for control plane communications that carry such information. In addition, higher data rate communication channels often require a handshaking process between the participating transceivers, for example after an initial network element start-up or after a network element reset, before data can be transmitted across the channel. Handshake processes can include negotiation of communication parameters such data transfer rate, coding scheme, and other protocol or hardware features. The handshaking process may also include clock synchronization between the transceivers. Such handshaking processes may not be feasible without access to configuration data typically provided via the control plane, thus typically necessitating a secondary, distinct control plane communication channel to be able to obtain the configuration data used to bring the higher data rate data plane communication channel on-line.

Figure 2:
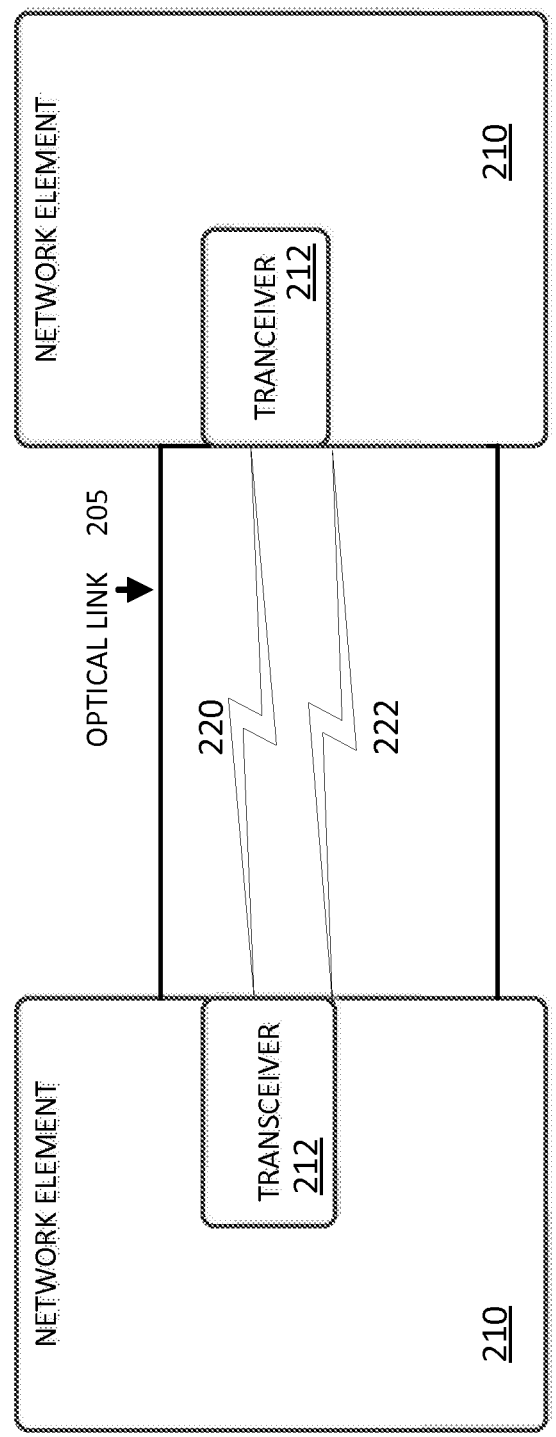
FIG. 2 is a block diagram of two network elements in communication via multiple communication channels.

FIG. 2 is a block diagram of two network elements in communication with each other. The network elements 210 are connected by a physical link 205 carrying both a high data rate communication channel 220 and a low data rate communication channel 222. The physical link 205 can be, for example, a fiber optic cable. The speeds that the communication channels can allow may vary, but the low data rate communication channel 222 generally operates at a lower speed than the high data rate communication channel 220. In some implementations, the high data rate is at least 1 or 2 orders of magnitude greater than the low data rate. For example the high data rate communication channel 220 can operate at or above about 10 Gps, e.g., at or about 10, 40, or 100 Gbps, and the low data rate communication channel 222 can operate at less than about 10 Gps, e.g., at or about 1 Gbps or lower. In some implementations, the two parallel communication channels are facilitated by one physical transceiver 214 in each network element 210. In some other implementations, the two parallel communication channels are provided by two transceivers in a network interface of each of the network elements 210. In some such implementations, the network interfaces include one transceiver for the high data rate communication channel 220 and a second transceiver for the low data rate communication channel 222. In other implementations, the high data rate and low data rate communication channels are provided by two logical transceivers in each network element 210, where the two logical transceivers share the same physical components of the transceiver, but signals received by the transceiver 214 are processed by separate transceiver logics depending on the data rate of the signal.

As mentioned above, in some implementations, the low data rate communication channel 222 can be facilitated by dedicated hardware in the network elements. For example, an additional dedicated transceiver can be included at a network interface on a network element 210, where the dedicated transceiver is configured for a lower data rate than the high data rate communication channel 220. In such implementations, the transceiver dedicated to low data rate communications is a transceiver suitable for communication via simple, reliable communications that require minimal configuration.

In other implementations, the low data rate communication channel 222 can be implemented in the form of a separate logical transceiver within a monolithic transceiver-ASIC. In some implementations, a network element 210 uses the low data rate communication channel 222 for data plane or control plane communications, only when the high data rate communication channel 220 is not initialized, for example, upon start-up or after a reset is complete. Once the high data rate communication channel 220 is on-line, the network element 210 carries out all communication over the high data rate communication channel 220. In other implementations, the low data rate communication channel 222 can be used for certain communications, e.g., control plane communications, even when the high data rate communication channel 220 is operational. In some implementations, the network element 210 uses the high data rate communication channel 220 for all data plane communications, and forgoes such communication if the high data rate communication channel 220 is off-line. The components of the network elements 210 are discussed in greater detail below, in reference to FIG. 3.

Figure 3:
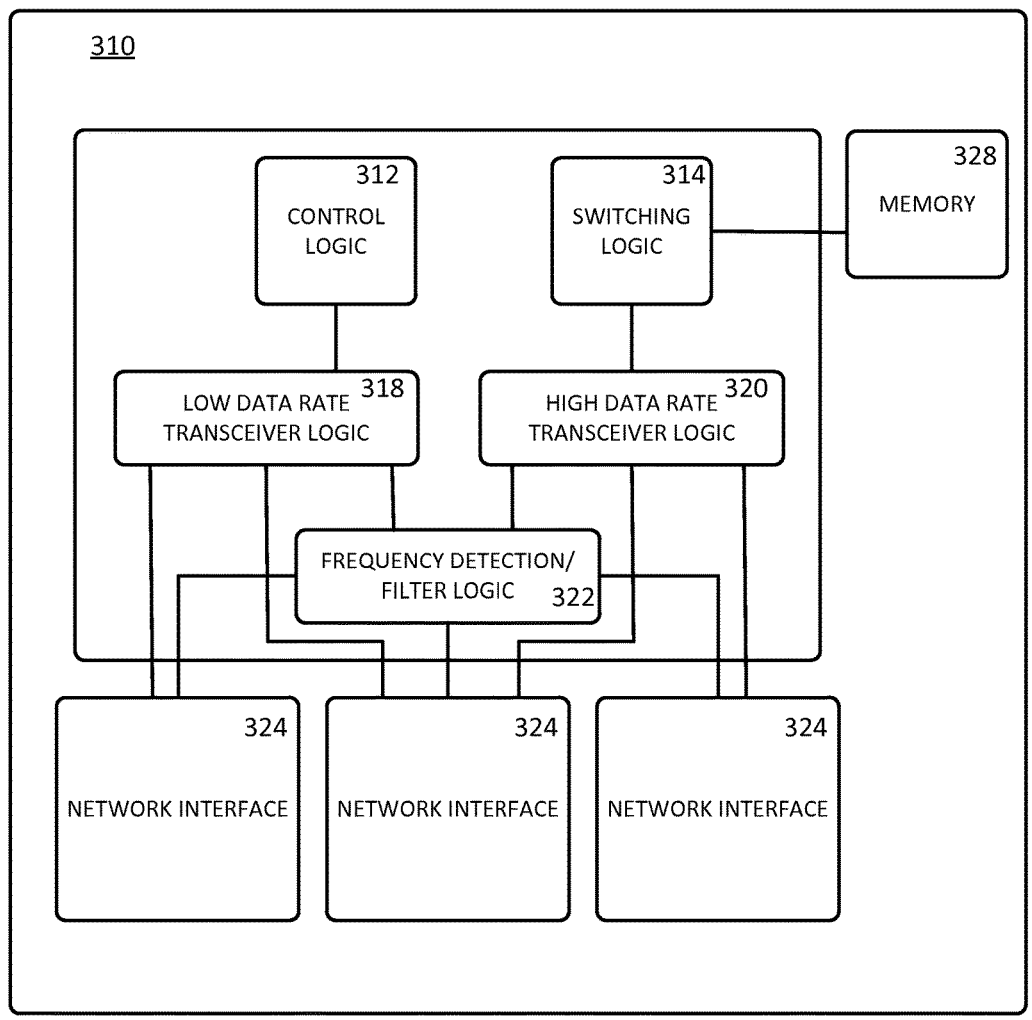
FIG. 3 is a schematic diagram of an example network element capable of communication via two communication channels.

FIG. 3 is a block diagram of a network element 310 that can communicate using a high data rate communication channel 220 and a low data rate communication channel 222 over a common physical network link. The network element 310 includes a plurality of network interfaces 324, frequency detection and filter logic 322 for detecting the data rate of received signals, a low data rate transceiver logic 318 for processing received low data rate signals, high data rate transceiver logic 320 for processing received high data rate signals, packet processing logic 316, control logic 312 for processing control plane information, and switching logic 314 for processing data plane information.

The network interfaces 324 included in the network element 310 are suitable for receiving an optical signal, converting the optical signal to an electronic signal and transmitting the electronic signal to the frequency detection and filter logic 322. The network interfaces 324 are also suitable for receiving an electronic signal from either the low data rate transceiver logic 318 or the high data rate transceiver logic 320, converting the received electronic signal to an optical signal, and transmitting the optical signal to another network element 310.

Accordingly, network interfaces 324 include a photodiode for receiving optical signals from other network elements via a physical link, such as a fiber optic cable. The photodiode is a semiconductor-based photodetector used to receive optical signals at the network interface 324. The photodiode can be one of many types of photodiode, including a p-n photodiode, a p-i-n photodiode, a metal-semiconductor-metal photodiode, or any other type of photodetector suitable for receiving optical signals. The photodiode can be coupled to a transimpedance amplifier, limiting amplifier or other component to convert the received optical signals to electronic signals that are sent to the frequency detection and filter logic 322.

Network interfaces 324 also include a laser module for transmitting optical signals to other network elements via a physical link, such as a fiber optic cable. The laser module includes a laser, a laser driver, and in some implementations a laser modulator. The laser module is used to transmit optical signals from the network element 310 to another device. The laser can be one of many types of lasers, including a vertical cavity surface emitting laser (VCSEL), a Fabry-Perot laser, a distributed feedback laser, or any other type of laser suitable for transmitting optical signals from the network element 310. The laser can be coupled to a laser driver capable of direct modulation or a continuous wave (CW) laser driver. For direct modulation laser modules, the laser module receives a pulse amplitude modulated signal, which can be amplified to directly drive the laser to have a variable amplitude output signal. For continuous wave laser drivers, the laser module receives a modulator drive signal for controlling a separate modulator that modulates a characteristic of the output laser light, such as the amplitude, the phase, the polarization, or other parameter. For example, in some implementations, the external modulator can be a Mach-Zehnder type interferometer.

The frequency determination and filter logic 322 included in the network element 310 processes the received electronic signal from the network interface 324 to determine the data rate of the signal encoded therein. In some implementations, the frequency determination and filter logic 322 includes a comparator and phase lock loop (PLL) or similar components to determine the signal frequency. The frequency determination and filter logic 322 then directs the signal to either the low data rate transceiver logic 318 or the high data rate transceiver logic 320 based on the determined data rate of the signal. For example, the filter logic may pass signals having a data rate above about 1 Gps to the high data rate transceiver logic 320 and signals having a data rate below 1 Gps to the low data rate transceiver logic 318. The high data rate and low data rate logics 320 and 318 process the electronic signals forwarded to them to convert the signals into actual data bits transmitted via the signal. Such processing may include signal demodulation, error correction, or other physical layer processes typically used to recover data bits from a signal. The processes employed by the high data rate and low data rate logics 320 and 318 are tailored to the modulation techniques and physical layer transmission protocols employed for communications at their respective data rates.

In addition to having different data rates, high data rate and low data rate signals received by the network element 310 can be encoded using different protocols. In some implementations, the low data rate signal received by the network element 310 uses a simple protocol that provides stable communication and does not require the network element 310 to be fully operational. For example, the low data rate signal received by the network element 310 can use a protocol compliant with RS-232 standard. In some such implementations, the frequency detection and filter logic 322 can identify the protocol used in the received signal and can forward the signal to either the low data rate transceiver logic 318 or the high data rate transceiver logic 320 depending on the detected protocol employed by the received signal.

The low data rate transceiver logic 318 included in the network element 310 can be implemented on one or more processors in the network element 310. In some implementations, the low data rate transceiver logic is implemented on a dedicated processor. In other implementations, the low data rate transceiver logic 318 is on the same processor as other components of the network element 310. The low data rate transceiver logic 318 is configured to receive electronic signals from the frequency detection and filter logic 322 and process the signal into data bits. As mentioned above, low data rate signals use simple, reliable protocols for encoding data. The low data rate transceiver logic 318 is configured to process signals that use simple, reliable protocols. The low data rate transceiver logic can processes received signals even when the rest of the network element 310 is not operational, such as when there is a configuration error in the network element 310 during startup. The low data rate transceiver logic 318 transmits configuration or control plane data encoded in low data rate signals to the control logic 312 of the network element 312.

The low data rate transceiver logic 318 is also configured to receive data in the form of data bits from the control logic 312, process the received data into an electronic signal using a simple, reliable protocol as described above, and transmit the electronic signal to the network interface 324 to be transmitted to another device, such as another network element 310.

The control logic 320 processes configuration data and instructions forwarded by a network controller, and carries out control plane functions. Such functionality can include installing software, resetting the network element, updating a forwarding table, or other control plane functions discussed above. The control logic 320 can receive configuration data and instructions from either the low data rate transceiver logic 318 or the switching logic 314 of the network element 310. The control logic 320 can also transmit configuration data or commands to the low data rate transceiver logic 318 of the high data rate transceiver logic 320 to be transmitted to other network elements or devices.

The high data rate transceiver logic 320 included in the network element 310 can be implemented on one or more processors in the network element 310. The low data rate transceiver logic 318 is configured to receive electronic signals from the frequency detection and filter logic 322 and process the signal into data bits. The high data rate transceiver logic 320 is configured to process high data rate signals received from the frequency detection and filter logic 322. High data rate signals that carry information to be forwarded to other devices or network elements, switching data, or other data plane or control plane information are processed by the high data rate transceiver logic 320 to convert the electronic signals received into data bits. The data resulting from the processing of received electronic signals by the high data rate transceiver logic 320 is transmitted to the switching logic to be further processed.

The high data rate transceiver logic 320 is also configured to receive data in the form of data bits from the switching logic 314, process the received data into an electronic signal, and transmit the electronic signal to the network interface 324 to be transmitted to another device, such as another network element 310.

The switching logic 314 is configured to implement at least the MAC layer and network layer protocols of the OSI stack within the network element 310. Specifically, the switching logic 314 receives the bit streams output by the high data rate transceiver logic 320 receiver logic of the network interface 312, forms the bit streams into packets, and determines whether the end-to-end destination of the packet is the network element 310 itself, or some other networked device, e.g., a different network element 310 or a host operating on one of the servers 120 in the network, or a host located in another network. If the packet is intended for a different device, the switching logic 314 can use a forwarding table or other switching data that is stored in the memory 328. If the packet is intended for the network element 310, the switching logic 314 forwards the packet to the control logic 320 for processing.

In some implementations, the low data rate transceiver logic 318, high data rate transceiver logic 320, the switching logic 314, and the control logic 312 can be implemented as computer executable instructions executed by a general purpose or special purpose processor. In some implementations, one or more of the low data rate transceiver logic 318, high data rate transceiver logic 320, the switching logic 314, and the control logic 312 can be implemented in part in specialized integrated circuit logic components, such as an ASIC or FPGA. The low data rate transceiver logic 318, high data rate transceiver logic 320, the switching logic 314, and the control logic 312 can be implemented on the same processor, on separate processors, or can each be distributed across multiple processors in the network element.

Figure 4:
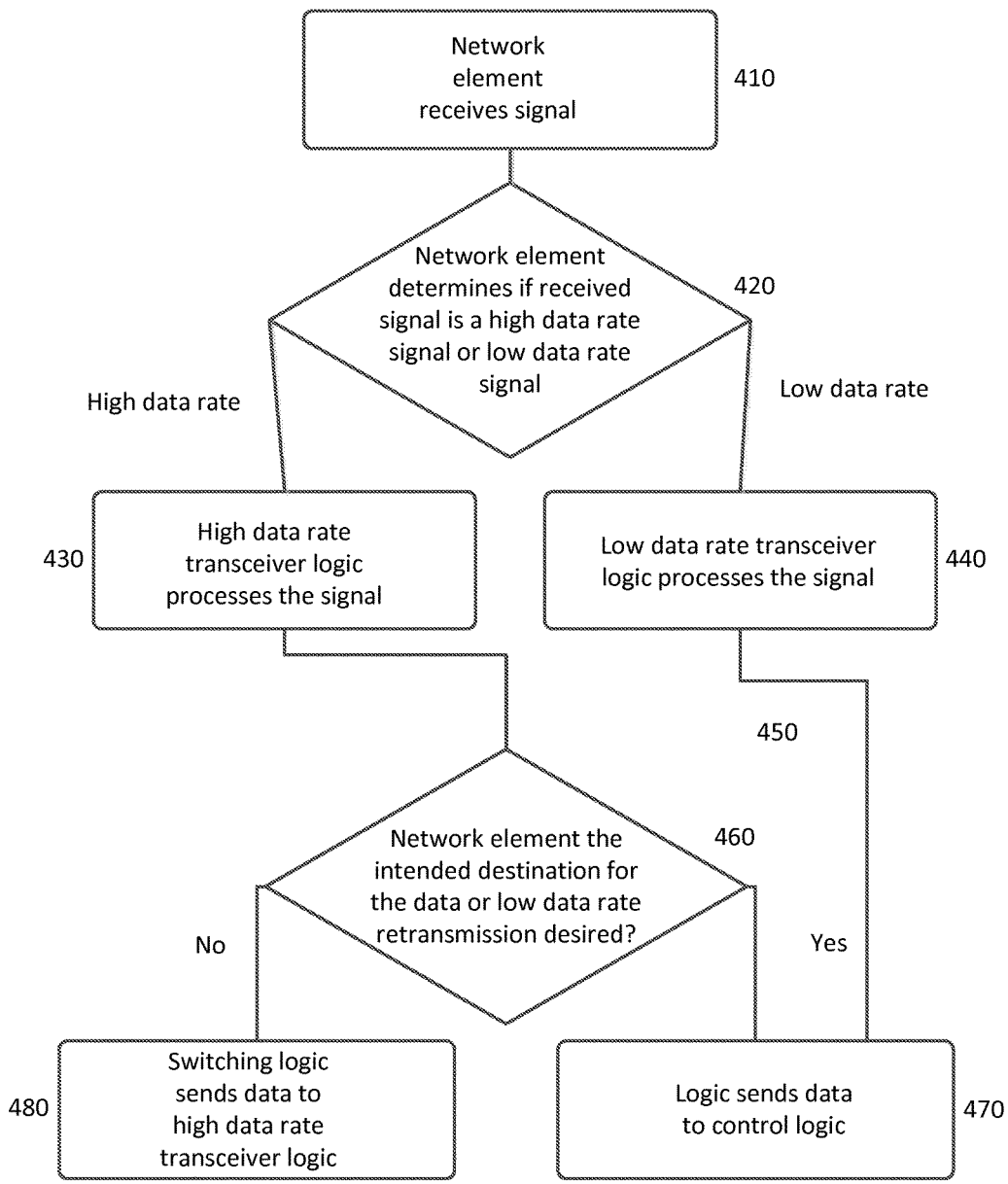
FIG. 4 is a flow diagram of an example method performed by a network element to implement an in-band control plane.

FIG. 4 is a flow diagram depicting the functionality of a network element 310 capable of using two parallel communication channels over a common physical communication link. Referring to FIGS. 3 and 4, the process 400 includes the network element 310 receiving a signal at a network interface 324 (step 410). The logic included in the network element 310 determines if the signal is a high data rate signal or a low data rate signal (decision box 420). If the signal is a high data rate signal, the high data rate transceiver logic 320 included in the network element 310 processes the signal into bits and sends the bit stream to the switching logic 314 (step 430). If the signal is a low data rate signal, the low data rate transceiver logic 318 included in the network element 310 processes the signal into bits and sends the bit stream to the control logic 312 (step 440). The switching logic 314 determines if the data encoded in the signal is intended for the network element 310 itself or for forwarding to another network element 310 (decision box 460). If the data is intended for the network element itself or intended to be transmitted to another network element via a low data rate signal, the switching logic 314 sends the data to the control logic 312 for further processing (step 470). If the data is intended for forwarding to another network element 310, the switching logic 316 sends the data to the high data rate transceiver logic 320 to be transmitted to the destination device (step 480).

The process 400 begins with the photodiode of the network interface 324 receiving a signal (step 410). The signal is an optical signal that is received via a fiber optic link from another network element 310. The signal received can be at any data rate from another network element 310 in the network. The optical signal received by the photodiode is converted into an electronic signal by the network interface 324. The network interface 324 then sends the electronic signal to the frequency detection and filter logic 322 of the network element 310.

The frequency detection and filter logic 322 of the network element 310 determines if the signal received is a high data rate signal or a low data rate signal. As discussed above, the frequency detection and filter logic 322 uses defined ranges for data rates of the high and low data rate communication channels to identify if the signal has a high data rate or low data rate (decision box 420). As discussed above, the frequency detection and filter logic 322 can determine the data rate of the signal using a PLL, comparator, and/or other components suitable for determining if the signal received is high data rate or low data rate. If the signal is determined by the frequency detection and filter logic 322 to be a high data rate signal, the frequency detection and filter logic 322 sends the high data rate electronic signal to the high data rate transceiver logic 320 to be processed (step 430). If the signal is determined by the frequency detection and filter logic 322 to be a low data rate signal, the frequency detection and filter logic 322 sends the low data rate signal to the low data rate transceiver logic 318 to be processed (step 440). The high data rate transceiver 320 processes the signal into bits and sends the resulting bit stream to the switching logic 314 (step 430).

The switching logic 314 processes the received bit stream and converts the bits into data packets. The switching logic 314 then determines the intended destination of each data packet (decision box 460). If a data packet is intended to be forwarded to another network element 310, as the case may be for data plane data or control plane data indented to be forwarded to another network element 310, the switching logic 314 processes the data for forwarding and sends the data to the high data rate transceiver logic (step 480). To process the data for forwarding, the switching logic can use forwarding tables or other switching data stored on the memory 328 included in the network element 310 to identify the next hop network element to forward the packet to in order for it to reach its ultimate destination.

If the indented destination of the a data packet is the network element 310 itself, as the case may be for control plane data being sent to the network element 310 itself, the switching logic 314 sends the data packet to the control logic 312 for processing (step 470). In addition, if the data is intended to be transmitted by the network element 310 to another network element 310 via a low data rate communication channel, as may be the case for configuration data or instructions being sent to a next-hop network element that is not operational, the data is sent to the control logic 312. The control logic 312 processes the data received from the switching logic 314 (step 480). The control logic 312 can carry out control plane functions as described above in reference to FIG. 3. As mentioned above, control plane functions can include updating switching data, installing software, configuring components of the network element 310, resetting the network element 310, or other control plane functions. If the control logic 312 receives data from the switching logic 314 that is intended to be transmitted to another network element 310 via a low data rate communication channel, such as configuration data or instructions, the control logic 312 can transmit such control plane data or instructions to the low data rate transceiver logic 318 to be transmitted to another device or network element 310. The process of transmitting control plane data by a network element 310 via a low data rate communication channel is discussed further in reference to FIG. 5 below.

Figure 5:
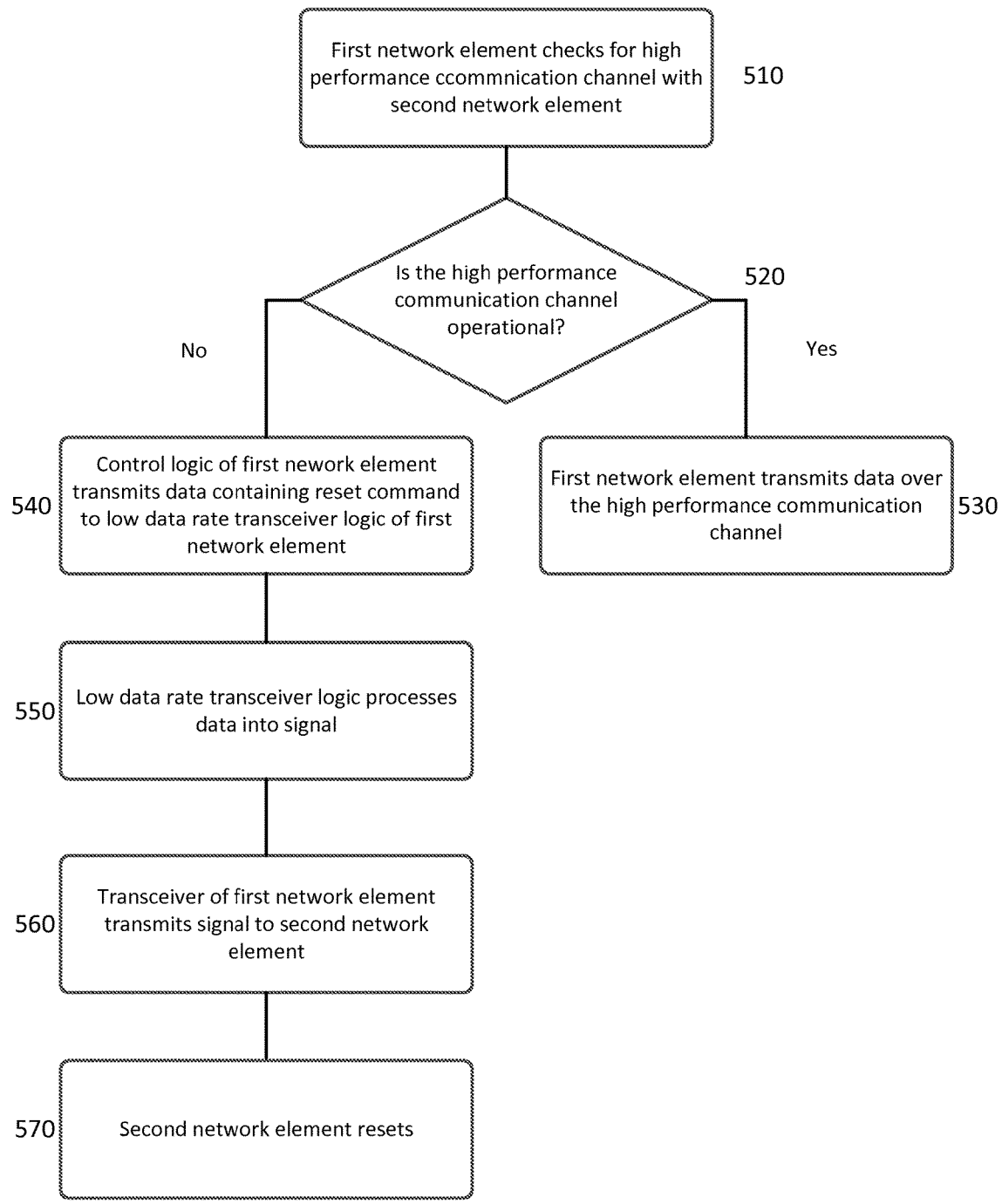
FIG. 5 is a flow diagram of an example method performed by a network element to reset another network element over a low performance communication channel.

FIG. 5 is a flow diagram depicting a process that can be used by a network element 310 capable of communication via a high data rate communication channel and a low data rate communication channel to reset a second network element 310 that is not operational. The process begins with the network element 310 checking for an operational high data rate communication channel (step 510). If the high data rate communication channel is operational (decision box 520), the network element 310 can transmit data to the second network element 310 over the high data rate communication channel (step 530). If the high data rate communication channel is not operational, the control logic 312 of the network element 310 transmits data containing a reset instruction to the low data rate transceiver logic 318 of the network element 310 (step 540). The low data rate transceiver logic 318 processes the received data and converts it into an electronic signal to be sent to the network interface 324 of the network element 310 (step 550). The transceiver transmits the signal to the second network element 310, that needs to be reset (step 560). The second network element 310 receives and processes the signal and resets (step 570).

The process 500 begins with the network element 310 checking for an operational high data rate communication channel (step 510). The network element 310 can check for an operational high data rate communication channel between the network element 310 and a second network element 310 by transmitting a data packet, an ICMP echo request message, or other message to the second network element 210 over the high data rate communication channel. If acknowledgement of the receipt of the data packet or message is not received by the first network element 210, the high data rate communication channel is not operational. If acknowledgement of the receipt of the transmitted data packet or message is received by the network element 210, the high data rate communication channel is operational. In some other implementations, each network element periodically announces itself to its next hop neighbors indicating its status. If a next hop network element fails to receive such an announcement after a configurable amount of time, the network element can consider the high data rate channel with the network element to be non-operational.

If the high data rate communication channel between the network element 210 and the second network element 210 is operational, the network element 210 can transmit data to the second network element 210 over the high data rate communication channel 220. In some implementations, the network element 210 transmits data plane information and control plane information over the high data rate communication channel when it is operational and uses the low data rate communication channel only when the high data rate communication channel 220 is not operational. In other implementations, the network element 210 can transmit data plane information over the high data rate communication channel and transmit control plane information over the low data rate communication channel even when the high data rate communication channel is operational.

If the high data rate communication channel 220 is not operational, the control logic 312 of the first network element 210 sends data containing a reset instruction to the low data rate transceiver logic 318 of the network element 210 (step 540). For example, the control logic 312 of the network element 210 can generate a signal that encodes a reset command to reset the second network element 210 or to reset a parameter of the second network element. As an example, the IP address of the second network element can be reset using an ipconfig command. The command is encoded in a bit stream by the control logic 312 using a simple, reliable protocol, such as an RS-232 compliant protocol and sent to the low data rate transceiver logic 318. As described above, in reference to FIG. 3, the low data rate transceiver logic 318 translates the bit stream into a signal. The low data rate transceiver logic 318 forwards the electronic signal to the network interface 324 of the network element 210 to be transmitted to the second network element 210 (step 550). The signal is transmitted as an optical signal by the laser module of the network interface 324 in the network element 210 to the second network element 210 (step 560).

The signal is received by the photodiode of the network interface 324 in the second network element 210 and processed by the low data rate transceiver logic 318 of the second network element 210 into a bit stream that the control logic 312 processes. The control logic 312 of the second network element 210 processes the bit stream, and carries out the instructions included in the data received and causes the second network element 210 to be reset (step 570).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "computer" or "processor" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database 312 management system, an operating system, a cross-platform runtime environment, a virtual machine, or a combination of one or more of them. The apparatus and execution environment can realize various different computing model infrastructures, such as web services, distributed computing and grid computing infrastructures.

What is claimed is:

1. A method for receiving data by a network element comprising:
    receiving a signal by a network interface of a network element;
    determining by the network element if the received signal is a high data rate signal or a low data rate signal;
    if the received signal is a high data rate signal, processing the signal into data by high data rate transceiver logic in the network element;
    if the received signal is a low data rate signal, processing the signal into data by low data rate transceiver logic in the network element;
    determining the intended destination of the data;
    if the received signal is a low data rate signal, processing the data by control logic in the network element; and
    if the received signal is a high data rate signal, processing the data by switching logic in the network element.

2. The method of claim 1, wherein receiving a signal by the network interface comprises receiving an optical signal.

3. The method of claim 1, wherein determining the intended destination of the data comprises processing the data by the switching logic in the network element.

4. The method of claim 1, wherein processing the signal into data comprises converting the signal into bits.

5. The method of claim 1, wherein determining if the received signal is a high data rate signal or a low data rate signal comprises determining a frequency of the signal.

6. The method of claim 1, wherein processing the data by the switching logic in the network element comprises determining a next hop for the data.

7. The method of claim 6, comprising transmitting, via the high data rate transceiver logic, the data to a device other than the network element.

8. The method of claim 1, wherein processing the data by the control logic in the network element comprises processing instructions for a configuration of the network element.

9. The method of claim 1, wherein processing the data by the control logic in the network element comprises processing instructions for a reset of the network element.

10. The method of claim 1, wherein processing the data by the control logic in the network element comprises processing instructions for updating a forwarding table of the network element.

11. A method for transmitting control plane data to a network element comprising:

checking for an operational high data rate communication channel between a first network element and a second network element over a physical link;

in response to an operational high data rate communication channel being detected, transmitting data addressed to a device other than the first network element and the second network element from the first network element to the second network element via the physical link using the high data rate communication channel; and in response to an operational high data rate communication channel not being detected, transmitting control plane data from the first network element to the second network element over a low data rate communication channel via the physical link.

12. The method of claim 11, wherein the control plane data comprises instructions for a configuration of the second network element.

13. The method of claim 11, wherein the control plane data comprises instructions for resetting the second network element.

14. The method of claim 11, wherein the control plane data comprises configuration data for facilitating a handshaking process with the second network element.

15. The method of claim 11, wherein checking for an operational high data rate communication channel between the first network element and the second network element comprises transmitting one of a data packet or an Internet control message protocol echo request from the first network element to the second network element.

16. The method of claim 11, wherein checking for an operational high data rate communication channel between the first network element and the second network element comprises determining, by the first network element, that no message has been received from the second network element via the high data rate communication channel for a period of time.

17. The method of claim 11, wherein transmitting data comprises transmitting data encoded in optical signals.

18. The method of claim 11, wherein transmitting the low data rate communication comprises transmitting via a low data rate transceiver logic included in a first network interface of the first network element.

19. The method of claim 11, wherein transmitting the high data rate communication comprises transmitting via a high data rate transceiver logic included in the first network interface.

* * * * *